J. A. KLOVSTAD.
SELF LOADING COAL AND GRAIN TRUCK.
APPLICATION FILED JAN. 10, 1920.
1,353,247.
Patented Sept. 21, 1920.
3 SHEETS—SHEET 1.
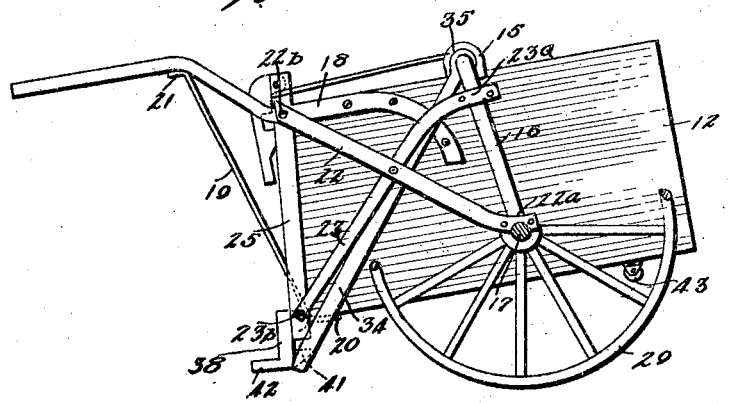
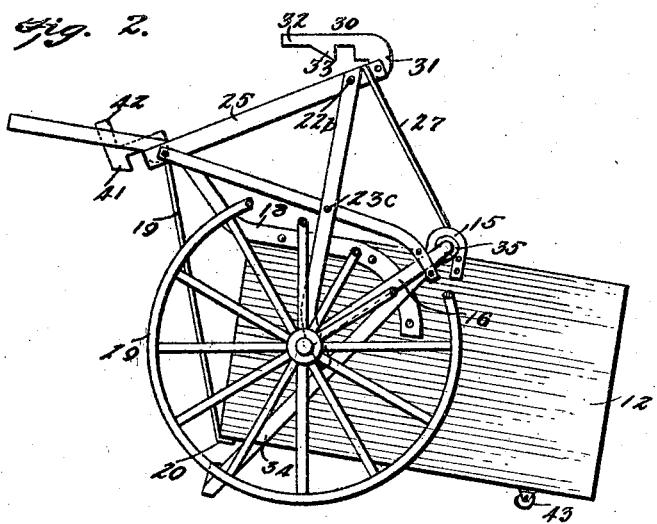
WITNESSES
INVENTOR
J. A. KLOVSTAD,
BY
ATTORNEYS

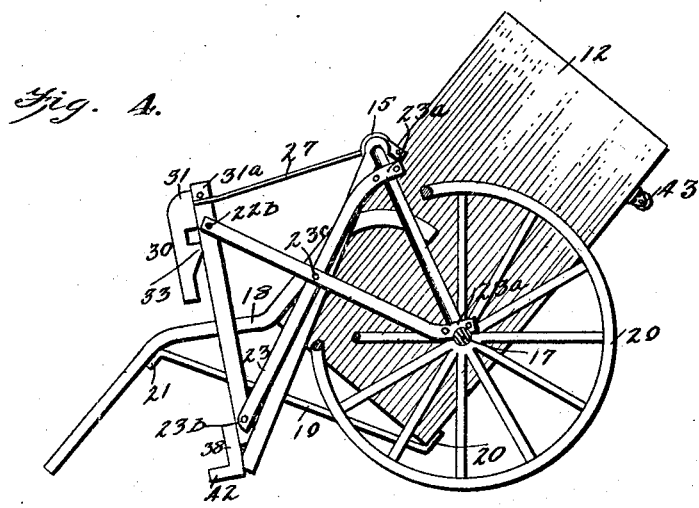
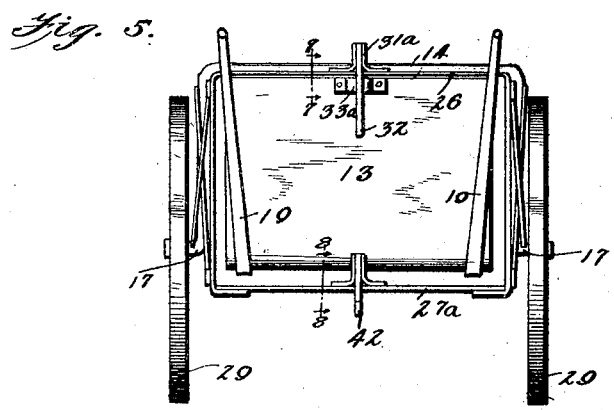
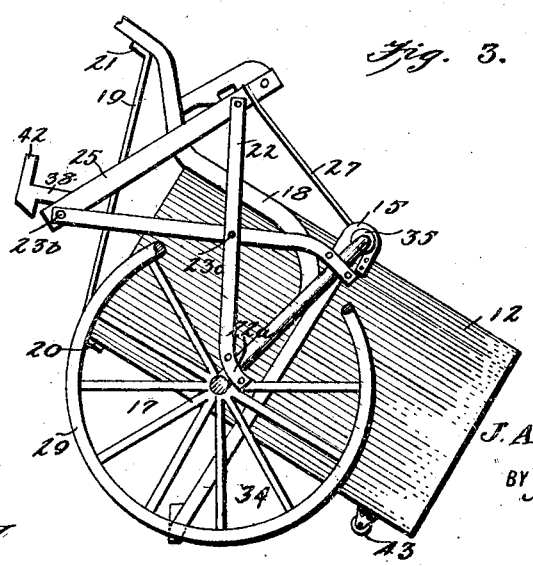

J. A. KLOVSTAD.
SELF LOADING COAL AND GRAIN TRUCK.
APPLICATION FILED JAN. 10, 1920.

1,353,247.

Patented Sept. 21, 1920.
3 SHEETS—SHEET 3.

WITNESSES

INVENTOR
J. A. KLOVSTAD,

BY

ATTORNEYS

UNITED STATES PATENT OFFICE.

JOHN ANDREW KLOVSTAD, OF HOPE, NORTH DAKOTA.

SELF-LOADING COAL AND GRAIN TRUCK.

1,353,247.  Specification of Letters Patent.  Patented Sept. 21, 1920.

Application filed January 10, 1920. Serial No. 350,623.

*To all whom it may concern:*

Be it known that I, JOHN ANDREW KLOVSTAD, a citizen of the United States, and a resident of Hope, in the county of Steele and State of North Dakota, have invented certain new and useful Improvements in Self-Loading Coal and Grain Trucks, of which the following is a specification.

My invention relates to trucks and has reference more particularly to that type of hand trucks that are designed to be self-loading and useful on farms, in cars, and warehouses, and has for its main object to provide a hand truck that will quickly load itself and can be transported from place to place with and without its load.

With this and other objects in view the invention consists in certain novel features of construction and arrangement of parts as will be hereinafter fully described, and set forth in the claims reference being had to the accompanying drawings in which—

Figure 1 is a side elevation of the device with portions broken out and in sections showing the truck preparatory to loading.

Figure 6:
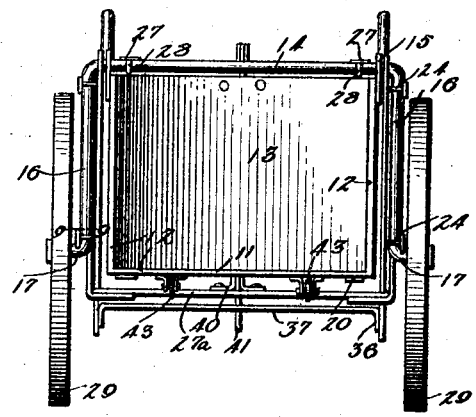
Figure 7:
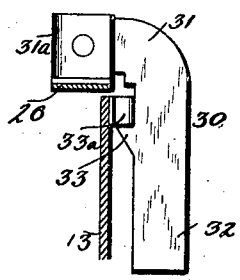
Figure 8:
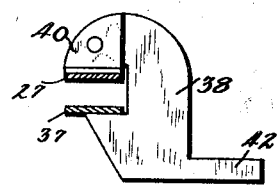
Figure 9:
Figure 10:
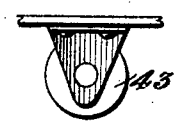

Fig. 2 is a similar view of the truck in its initial position for beginning to load, Fig. 3 is a similar view of the truck in one of the positions assumed in the loading operation, Fig. 4 is a similar view of the truck showing the loading finished and trimming of the load, Fig. 5 is a rear elevation of the truck preparatory to beginning the loading operation, Fig. 6 is a front elevation, Fig. 7 is an enlarged sectional detail on line 7—7 of Fig. 5, showing the pan or body latch, Fig. 8, is a similar view on line 8—8 of Fig. 5, showing the loading lever latch, Fig. 9 is a detail section showing clip fastening for wheel frame, and Fig. 10 is an enlarged elevation of one of the friction rollers at the front of the pan.

In carrying out my invention I use a pan open at the front and having a bottom wall 11 two side walls 12 and a rear wall 13. The pan is suspended to swing freely on an arched or cranked axle 14 by means of perforated ears 15 projecting upwardly from each side wall 12, the axle including the cross bar or arch 14, the side arms 16 and the outwardly projecting stubs 17.

Bent handles 18 are rigidly secured to the outer faces of the side walls of the pan and project upwardly and rearwardly to the rear of the pan as shown. These handles are supported by the braces 19 the lower ends of which are rigidly secured to the under side of the pan at or near the rear lower corners, as indicated by 20, while the upper ends of the braces are rigidly secured to under sides of the handles as indicated by 21.

The arched axle is carried by what I shall designate a wheel frame which comprises the diagonally crossed metal straps at each side of the pan, 22 and 23, the strap 22 having its front end curved as at $22^a$ resting on the stubs 17 and rigidly clamped to the side arms 16 of the axle by the clips 24, the rear or upper end of strap 22 is rigidly connected $22^b$ to the side bars 25 of a rectangular yoke which includes the top cross bar 26 and the bottom cross bar $27^a$. The yoke may be made with the top side and bottom bars integral, or the bottom bar may be separate and welded or riveted to the inturned bottom ends of the side bars thereof.

The cross strap 23 has its front or upper end curved as at $23^a$ and its rear or lower end riveted or welded to the side bars of the yoke as indicated by $23^b$. Where the diagonal straps cross it approximately at their centers they are riveted or welded together as indicated by $23^c$.

Rigidly secured upon the cross member 14, of the axle at their forward ends are the top straps 27 said forward ends being rigidly secured to said cross member 14 by the clips 28, while their rear ends lie on and are rigidly connected by riveting or welding to the top bar of the yoke. On the stubs 17 are revolubly mounted the wheels 29. As now understood the wheel frame consists of the yoke, the diagonally crossed side straps and top straps secured to the arch of the axle and the yoke.

The top bar has pivotally mounted on it at approximately its transverse center a hand latch 30 having a bent portion 31 pivotally mounted to a bracket $31^a$ secured on the top bar of the yoke, and a finger piece 32 provided with a pawl 33 which engages under a keeper $33^a$ projecting from the rear wall of the pan adjacent its upper edge the function of said latch being to lock the wheel frame and pan together and also, by releasing same to permit the pan to drop and swing to loading position.

Pivotally mounted on the cross member 14 of the crank axle, are the loading levers 34, the upper ends of same having eyes 35 by which the said levers swing on said crank axle 14. There is one of these levers at each side of the truck and they are hung outside of the pan out of the plane of the handles and within the plane of the side arms of the axle so that they swing freely without binding action.

The lower ends of the aforesaid loading levers are rigidly secured to the down turned ends 36 of the cross bar 37, which normally lies beneath the bottom cross bar of the yoke and to which it is locked by a swinging latch 38, having a bent end 39 pivotally mounted in a bracket 40 secured to the lower cross bar of the yoke the latch having a beveled nose 41, which engages under the said cross bar of the yoke; the latch is also provided with a foot piece 42 by which it is operated to throw it out of action. From the above it will be seen that the loading lever is substantially U shaped.

Near the front or open end of the pan and to the under surface of the bottom wall are secured friction rollers 43 which are spaced apart and act as casters to reduce the friction of the front end of the pan in the loading operations as will be hereinafter pointed out.

The operation of the device is as follows: Assuming that the truck is about to be loaded the wheel frame is latched to the cross bar connecting the loading levers, and the pan is latched to the top cross bar of the yoke of the frame with the parts positioned as in Fig. 1. The latch 30 is released and the wheel frame raised thereby lowering the pan to the floor in position for loading; the catch 38 is then released at bottom of wheel frame and drops loading levers to position as shown in Fig. 2. Raising the handles 22, sets loading levers forward as shown in Fig. 3 and lowering handles to position Fig. 2 forces loading; this operation is repeated for size of load required, and, when sufficient load is obtained, lowering the handles to the floor puts the load to its place in the pan and the yoke picks up by the latch 38, the loading levers as shown in Fig. 4; the operator now steps on wheel frame at or near latch 38, raising handles 22 to position shown in Fig. 1, loaded ready to move.

The friction rollers or casters 43, hereinbefore referred to as being on the bottom of the pan relieves the friction while loading, as it will be understood that the truck is being intermittently moved forward due to swinging of the loading levers during the loading operation.

From the above it will be seen that I provide a simple and effective self-loading truck by means of which coal, grain and other materials can be quickly loaded and transported from place to place.

I claim:

1. A self-loading truck comprising a loading pan, an arched axle, including upright side arms, stubs projecting outwardly from said arms, and a cross bar connecting said side arms, a loading pan freely suspended from said cross bar, a wheel frame rigidly secured to said axle, a loading lever pivotally mounted at one end on said axle and adapted to progressively fulcrum on the ground at the opposite end, latch means detachably connecting the wheel frame and pan, latch means detachably connecting the wheel frame and said loading lever, and handles carried by the pan for swinging the pan with respect to the wheel frame and causing automatic action of the loading lever.

2. In a self loading truck the combination with an arched axle and a loading pan freely suspended thereon, a wheel frame rigidly connected with said axle, loading levers flexibly suspended from said axle, means for connecting and disconnecting the pan with said wheel frame and means for connecting and disconnecting the loading levers with the wheel frame.

3. A self loading truck comprising a loading pan, an arched axle from which said pan is freely suspended, wheels carried by said axle, said pan provided with rearwardly extending handles, a wheel frame rigidly secured to said axle at each side of the pan, and including top and bottom cross bars at the rear, loading levers pivotally mounted at their upper ends to the arched axle on each side of the pan and inside the planes of the wheels a cross bar connecting said levers adjacent their lower ends, latch means carried by the top cross bar of the wheel frame for connecting and releasing the rear upper end of the pan, and latch means carried by the lower cross bar of the wheel frame for engaging and releasing loading lever connecting bar.

4. A self loading truck comprising a scoop pan, an arched axle from which said pan is freely suspended, said pan provided with rearwardly extending handles, in combination with a loading lever pivotally suspended on said arched axle and adapted to engage at its opposite end the surface upon which the scoop pan is operating to fulcrum progressively upon the raising and lowering of the scoop pan handles, and means for maintaining the fulcrum end of said lever above said surface when in inactive position.

5. A self loading truck including a scoop pan, an arched axle from which said pan is freely suspended, supporting wheels carried by said axle upon which said pan is adapted to be balanced, a wheel frame rigidly connected to said axle and comprising side sections rigidly secured to the axle arms and to a rear yoke, said yoke comprising top and bottom rear cross bars, and top side bars rigidly secured at one end to the arched axle, loading levers pivotally secured at one end to arch of said axle a pivoted latch mounted on the top cross bar of the wheel frame and adapted to automatically couple the said wheel frame and scoop pan, a cross beam connecting the said loading levers adjacent their lower ends, and a pivoted latch carried by the lower cross bar of the aforesaid yoke and adapted to automatically couple said loading levers with said yoke of the wheel frame.

6. A self loading truck comprising a scoop pan, an arched axle from which said pan is pivotally swung, said pan provided with rearwardly extending handles, a wheel frame carrying said axle, a loading lever pivotally connected at one end to said axle, said lever adapted to swing on said axle and fulcrum at its opposite end on the surface on which the scoop pan is operated, means for connecting the rear end of pan with the wheel frame and for releasing the same, and means carried by the wheel frame for connecting and releasing said lever with respect to said wheel frame.

7. A self loading truck including an arched axle and wheels carried thereby, a scoop pan pivotally hung on said arched axle, lever means pivotally secured at one end to said axle and adapted to be dropped and fulcrum at its other end on the ground, and means for causing the front end of said pan to tilt toward the ground.

JOHN ANDREW KLOVSTAD.